United States Patent [19]
Kaniut

[11] Patent Number: 5,092,293
[45] Date of Patent: Mar. 3, 1992

[54] CRANKSHAFT-SYSTEMS FOR SPLIT ENVIRONMENTAL ENGINES AND MULTI-SPLIT ENVIRONMENTAL ENGINES

[76] Inventor: Herbert M. Kaniut, Orrerweg 33/35, 5000 Köln 71, Fed. Rep. of Germany

[21] Appl. No.: 527,825

[22] Filed: May 24, 1990

[30] Foreign Application Priority Data

May 30, 1989 [DE] Fed. Rep. of Germany ....... 3917494

[51] Int. Cl.$^5$ ............................................. F02B 77/00
[52] U.S. Cl. ............................ 123/198 F; 123/192.2; 192/67 A
[58] Field of Search ........... 123/192 B, 197 R, 197 C, 123/198 F, DIG. 8; 192/53 B, 67 A

[56] References Cited
U.S. PATENT DOCUMENTS

| | | | |
|---|---|---|---|
| 3,252,553 | 5/1966 | Peterson | 192/53 B |
| 4,069,803 | 1/1978 | Cataldo | 123/198 F |
| 4,523,558 | 6/1985 | Maucher et al. | 123/198 F |
| 4,555,003 | 11/1985 | Phillips | 123/198 F |

FOREIGN PATENT DOCUMENTS 3522988 6/1986 Fed. Rep. of Germany .
2102066 1/1983 United Kingdom ............. 123/90.31

Primary Examiner—Noah P. Kamen
Attorney, Agent, or Firm—White & Case

[57] ABSTRACT

Crankshaft systems for split and multi-split environmental engines are disclosed which are comprised of partial crankshafts, split balance shafts, and selectively adapted self-synchronizing clutches, all which cooperate dynamically wtih each other such that the split and multi-split environmental engines have equal firing distances, a secured balancing of the free dynamical forces and free dynamical couples of the 1st order, and an acceptable balancing of the free dynamical forces and free dynamical couples of the 2d order, and smooth running of the partial engines operating singly and of the clutched-un complete engines. Said crankshaft systems having the objective, to reduce effectively the total amount of exhaust gases, and to reduce extensively $CO_2$ emissions and the fuel consumption.

10 Claims, 10 Drawing Sheets

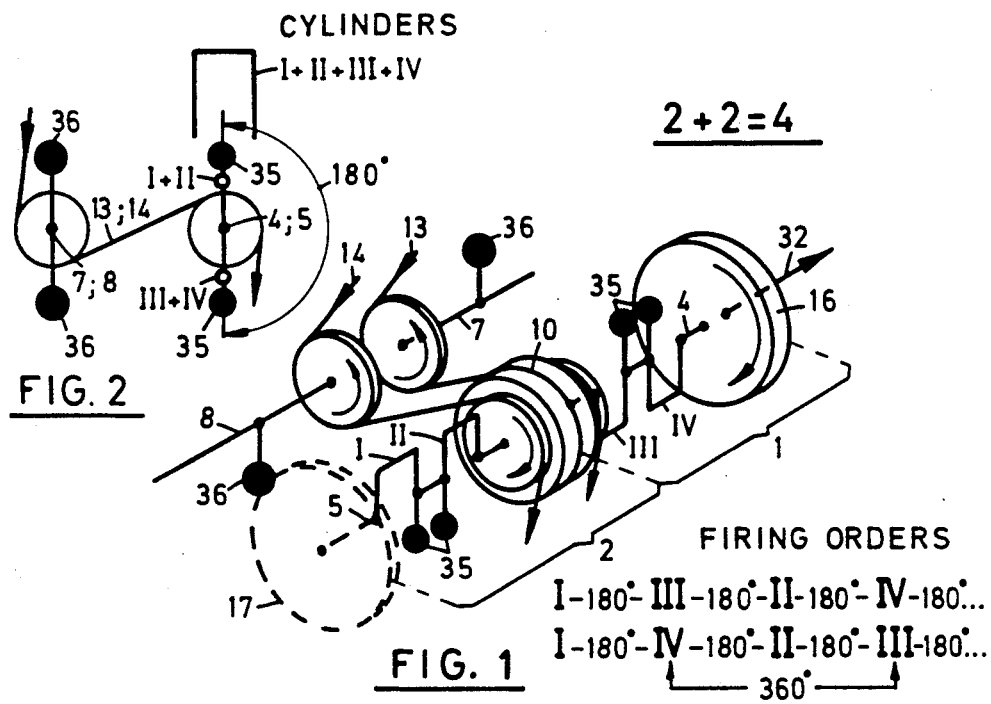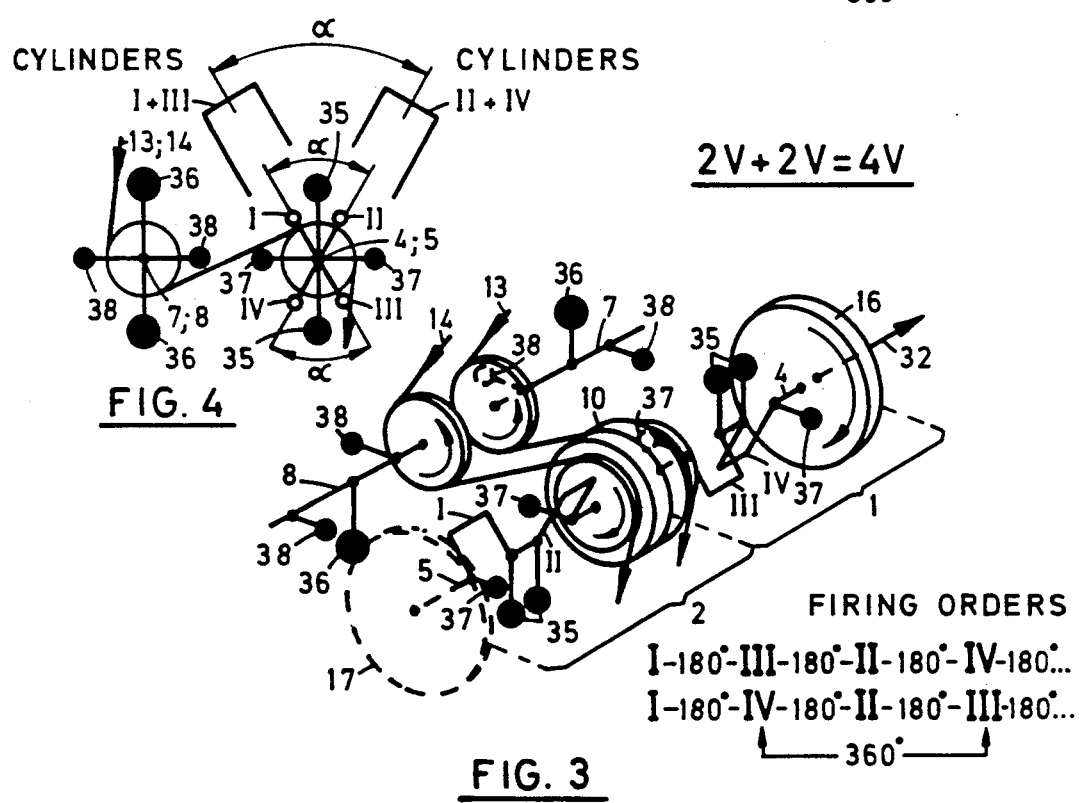

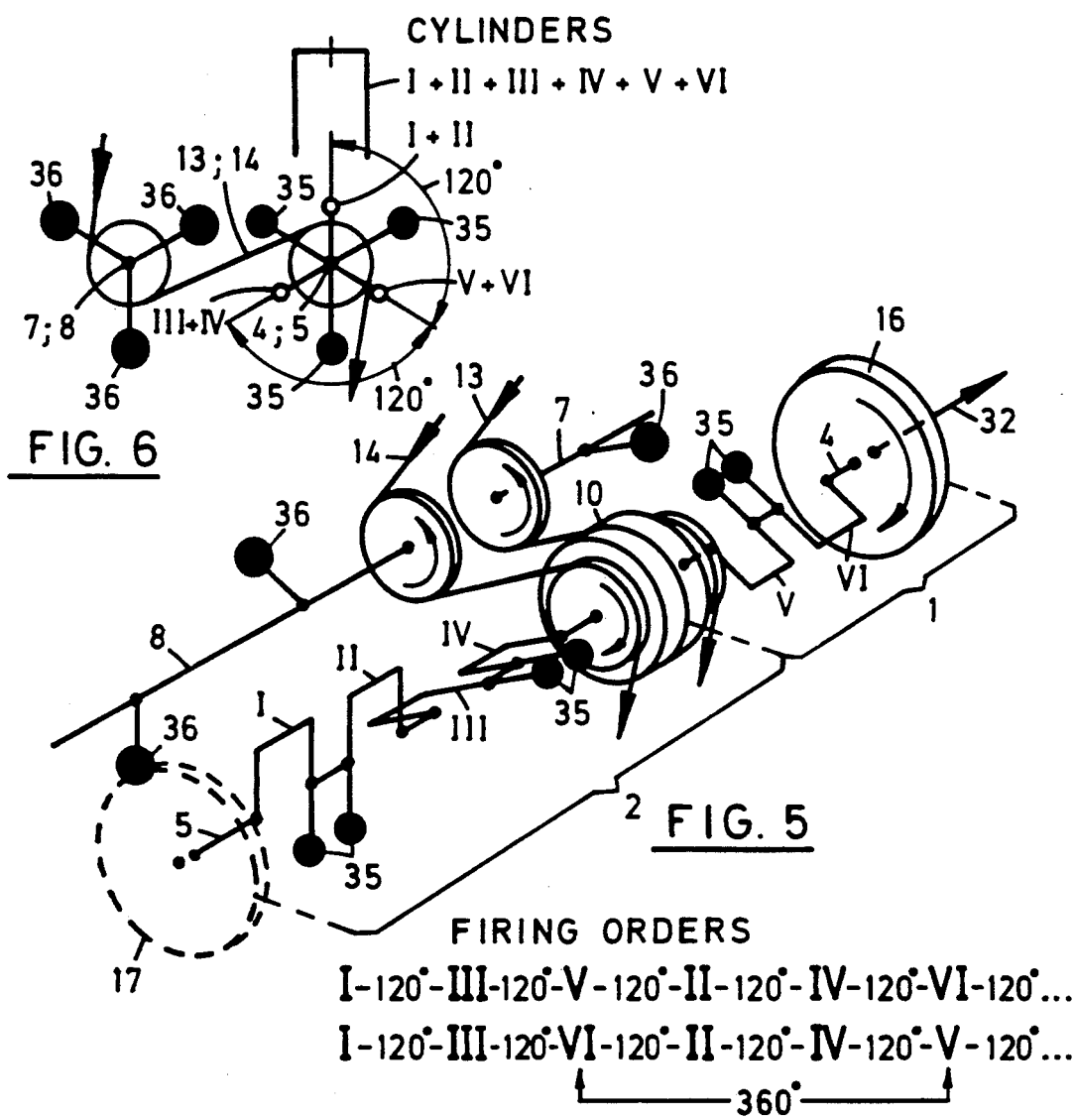

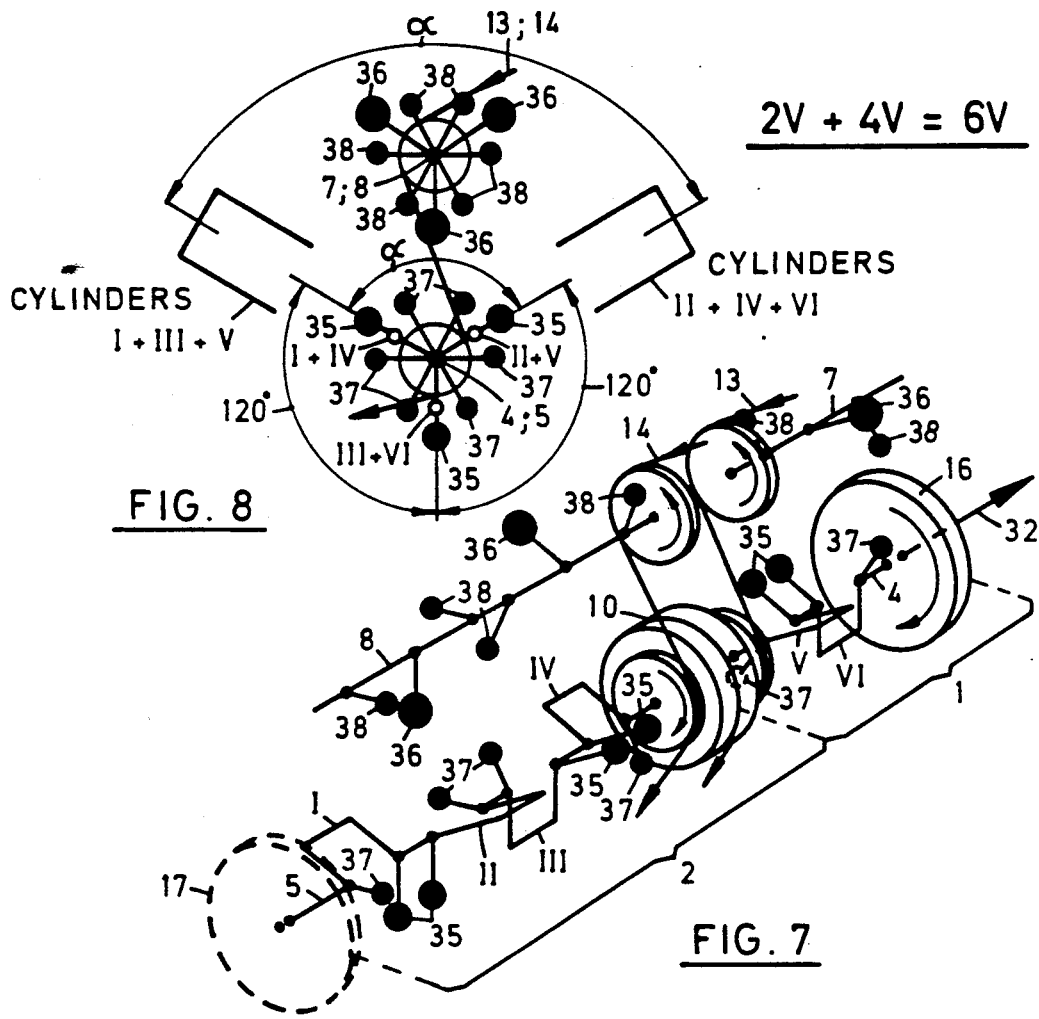

2+2+2=6
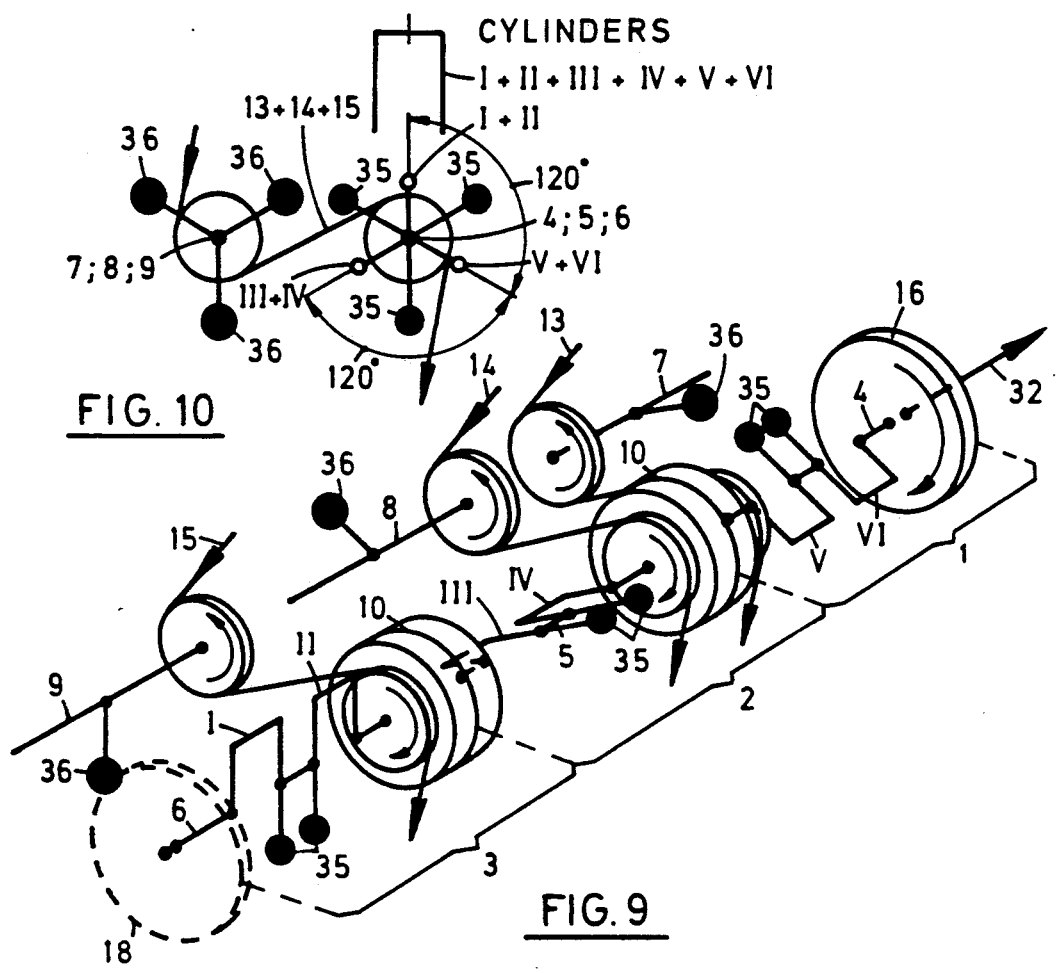
FIG. 10
FIG. 9
FIRING ORDERS
I-120°-III-120°-V-120°-II-120°-IV-120°-VI-120°...
I-120°-III-120°-VI-120°-II-120°-IV-120°-V-120°...
I-120°-IV-120°-V-120°-II-120°-III-120°-VI-120°...
I-120°-IV-120°-VI-120°-II-120°-III-120°-V-120°...
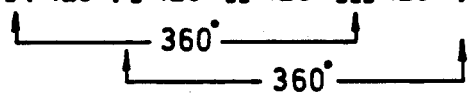

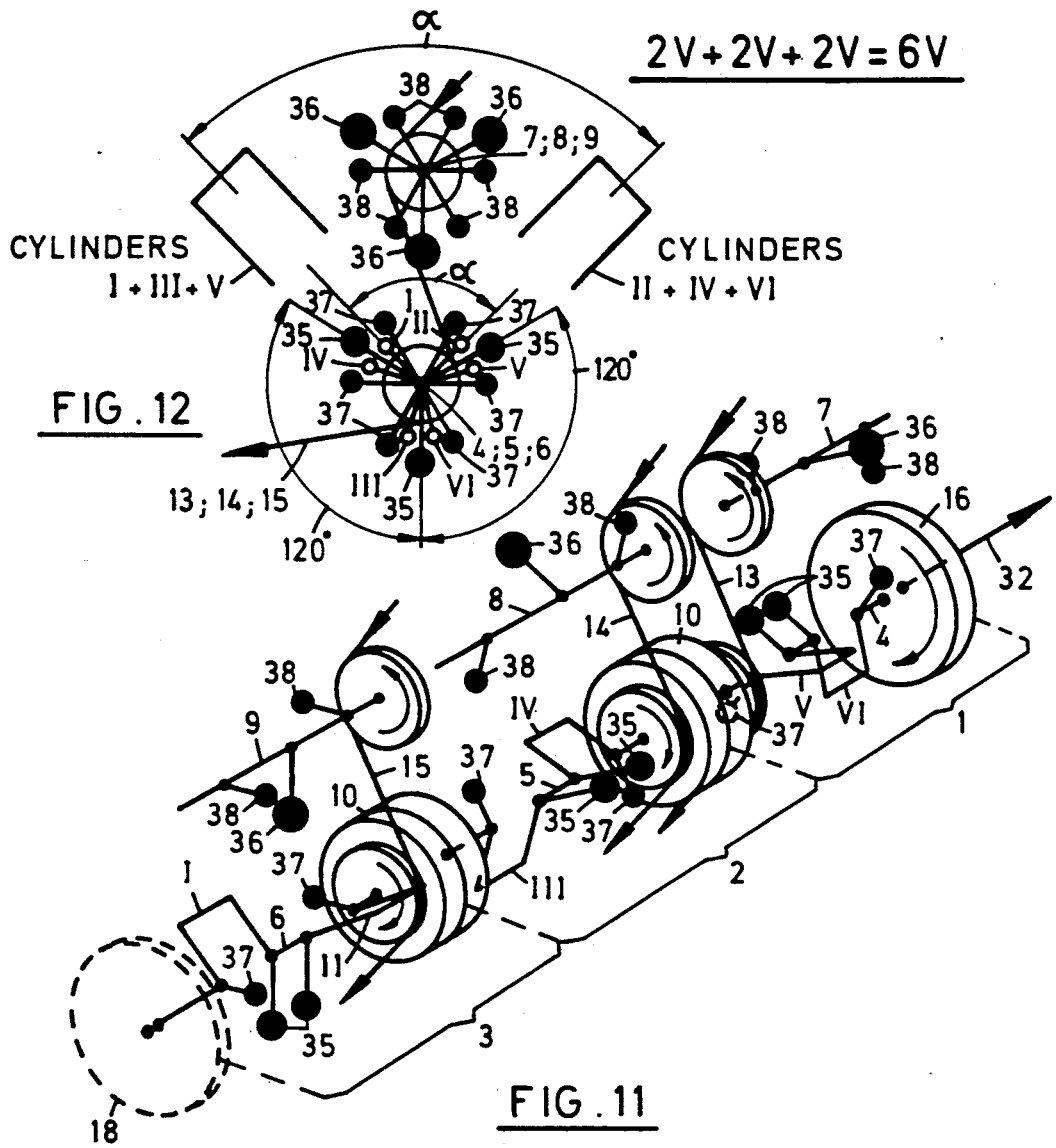
FIG. 12
FIG. 11
FIRING ORDERS
I-120°-III-120°-V-120°-II-120°-IV-120°-VI-120°...
I-120°-III-120°-VI-120°-II-120°-IV-120°-V-120°...
I-120°-IV-120°-V-120°-II-120°-III-120°-VI-120°...
I-120°-IV-120°-VI-120°-II-120°-III-120°-V-120°...
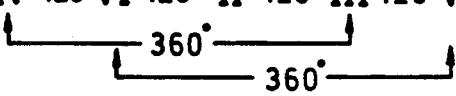

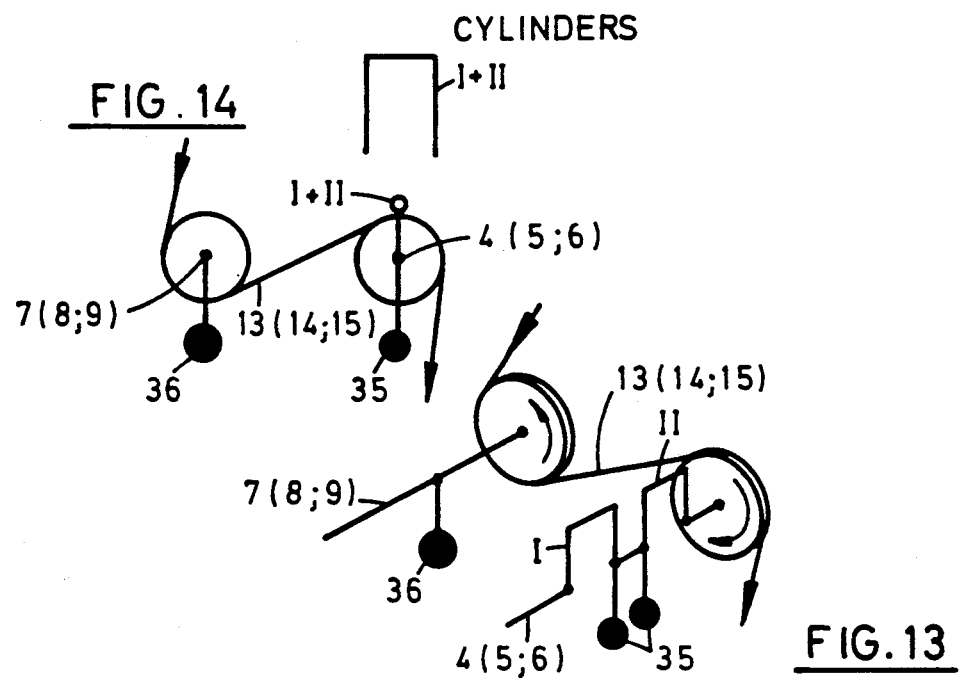
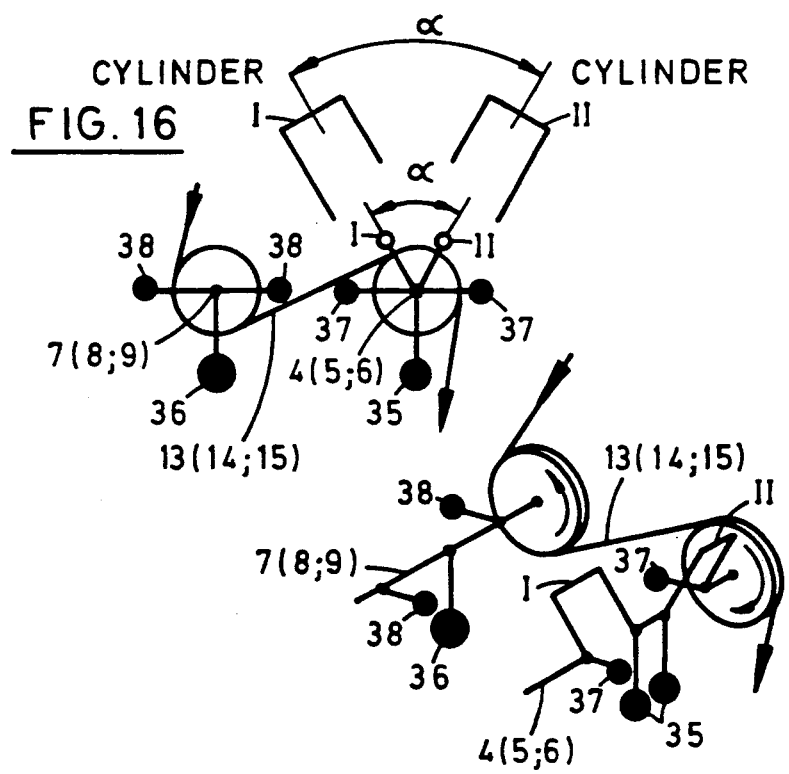

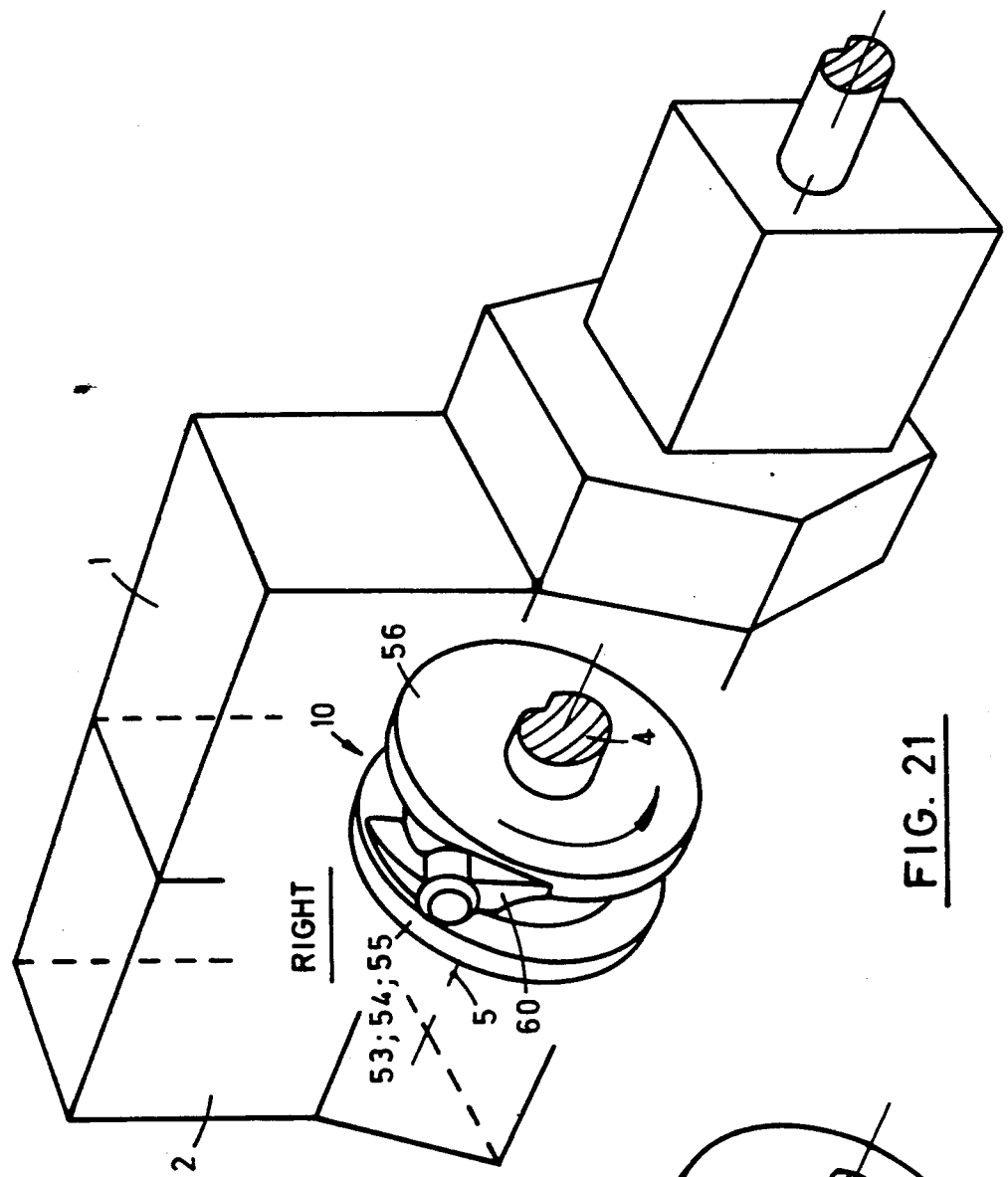
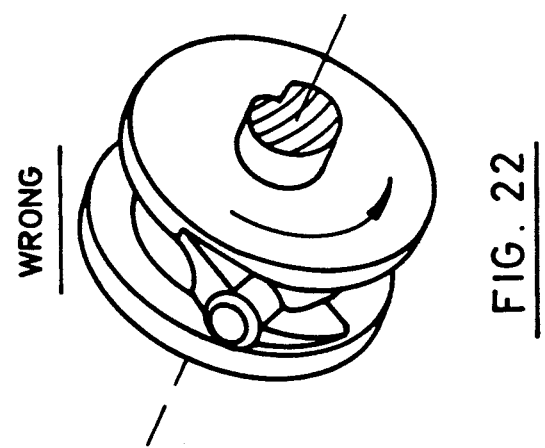

CRANKSHAFT-SYSTEMS FOR SPLIT ENVIRONMENTAL ENGINES AND MULTI-SPLIT ENVIRONMENTAL ENGINES

BACKGROUND OF THE INVENTION

This invention relates generally to split environmental engines and to multi-split environmental engines which are suitable for split engine crankshaft operation whereby an engine may operate on less than all of its cylinders under light load conditions and on all of its cylinders under full load conditions. This invention relates in particular to crankshaft systems for split and multi-split environmental engines comprising, in addition to such crankshafts, self-synchronizing clutches and special split balance shafts, which are newly combined with each other, and which cooperate dynamically as components of the crankshaft systems. These three components, coordinated with each other, must be taken into account when well balanced and smooth running split and multi-split environmental engines are constructed. Notable is also that all three components taken together replace the one piece crankshafts of conventional engines.

Split crankshaft engines appear to have the capacity, to reduce effectively the total amount of exhaust gases, and to reduce extensively $CO_2$ emissions of motor vehicles, to restrain the climatic hothouse effect, to decontaminate the city air, and to reduce fuel consumption.

The major problems associated with split environmental engines and multi-split environmental engines are:

(1) the balancing of free dynamical engine forces and of free dynamical engine couples generated by the partial engines when running alone, and generated by the complete engine, when working as an aggregate; and (2) the shock free synchronization operation of the synchronizing clutches installed between the partial crankshafts.

Both of these problems have their origins in the crankshaft systems of split engines of the prior art.

Regarding the first problem of the prior art mentioned above, it is know from the dynamics of the reciprocating piston engines that an engine runs smoother as more cylinders cooperate, and runs rougher when less cylinders are in action. The split environmental engines have a small number of cylinders, particularly when the partial engines are running alone. Problems with coordination arise when the partial engines are clutched together, due to the mutual adjustments of the firing orders and of the changing dynamical forces. Balancing problems of these engines, therefore, are of special importance, and difficult corrective means are required. The means provided in the present invention are novel crankshaft designs, novel balance shafts, and specially arranged counterweights on both of said shafts.

Regarding the second problem in the prior art mentioned above, the manner in which the synchronization operation is carried out is also of importance in the design of the partial crankshafts. For example, studies have shown that a synchronization after 720° relative revolution for 4-stroke engines is not always required. The present invention encompasses a crankshaft design which makes a synchronization after 360° relative revolution possible, while still achieving equal firing distances and smooth running of 4-stroke engines.

A smooth running engine also embraces shock-free synchronization operation of the clutch between the partial crankshafts. In this respect the hitherto proposed clutch designs appear to be unsatisfactory. This obligation is leveled against synchronizing clutch designs relying on the principle, at which the rigid connection of the two partial crankshafts occurs during the cranking-up operation of the secondary engine by the primary engine. This might produce heavy connection shocks, which are not acceptable. This synchronizing principle is the basis of many proposed synchronizing clutches.

A careful investigation of the relative rotation motions occurring during a cranking-up and synchronizing operation of two partial crankshafts shows that there are two relative rotation directions. In the first case, and during the starting and cranking-up operation of the secondary engine by the primary engine, the primary engine advances the secondary engine in what represents the first relative rotation direction. In the second case, after the secondary engine has started firing, and with the development of its power torque, the friction clutch-part of the self-synchronizing clutch can be arranged to slide. When it is especially prepared for this by a reduced torque transferring capacity as in the present invention, by which the secondary engine advances the primary engine, and what represents the second relative rotation direction.

Accordingly, it is an object of the present invention to provide well balanced and shock-free crankshafts systems for split environmental engines and for multi-split environmental engines consisting of partial crankshafts, split balance shafts, and self-synchronizing clutches coordinated with each other, in place of the one-piece crankshafts of conventional engines, thereby ensuring a vibration-free and smooth running of the partial engines and of the complete engine.

Another object of the present invention is to provide crankshaft systems for split and multi-split environmental engines ensuring equal firing distances at the 4-stroke partial engines and the complete engine.

Yet another object of the present invention is to provide crankshaft systems for split and multi-split environmental engines ensuring a shock-free automatic synchronization of the partial crankshafts to the complete crankshafts.

SUMMARY OF THE INVENTION

The split and multi-split environmental engines of the present invention consist of two or more partial engines which have their own partial crankshafts, with self-synchronizing clutches installed therebetween.

In a split environmental engine and multi-split environmental engine for motor vehicles, which engine includes coaxially arranged split crankshafts with a primary partial crankshaft for a primary engine disposed at the rear power output end of the engine, at least one secondary partial crankshaft for at least one secondary engine disposed at the front end of the engine, and connecting clutches; a crankshaft system of the present invention comprises two partial crankshafts, each of which comprises at least one pair of cranks with a firing distance of 360°, each of said crank pair consisting of two parallel cranks for in-line engines, and of two cranks with a relative gyration offset angle for V-engines, and two connecting rod-journals such that the two connecting rod-journals of said two cranks of one pair are positioned in the same time in their upper dead centers or respectively in their lower dead centers, and each of said partial crankshafts comprising specially arranged counterweights and being equipped with its own partial flywheel; split balance shafts consisting of partial balance shafts, each of said partial balance shafts being coordinated with one of said partial crankshaft in each partial engine and individually and oppositely driven by said partial crankshaft, said partial balance shafts being disposed in one line and parallel to said partial crankshafts, on their sides and respectively above them, and each said partial balance shaft comprising specially arranged counterweights; and selectively adapted self-synchronizing clutches comprising a friction clutch-part and an axially latching-on ratchet mechanism-part, both said clutch-parts connected in parallel so that torque can be transferred by one or the other of said clutch-parts as well as by both clutch-parts together, and said friction clutch-part having as a characteristic feature a reduced torque transferring capacity resulting in a slowly sliding movement of said friction clutch-part when the torque of the firing secondary engine is applied, said ratchet mechanism-part having a characteristic grip-direction being opposite to that of the relative rotation direction between said two partial crankshafts during starting and cranking-up operations of the secondary engine, the ratchet wheel of said ratchet mechanism having only one pawl-gap for each pawl, which results in only one clutching-in point after each complete relative revolution, and which clutching-in point coincides with the synchronization-point between the two said partial crankshafts and the two said partial engines, and said self-synchronizing clutches being characterized by a shock-free and automatic mutual synchronization of said partial crankshafts and said partial engines; whereby all components of said crankshaft system cooperate dynamically in this characteristic manner such that the split and multi-split environmental engine has equal firing distances inside of their 4-stroke partial engines, and inside of the clutched-in complete 4-stroke engines, a secured balancing of the free dynamical forces and free dynamical couples of 1st order, and an acceptable balancing of the free dynamical forces and free dynamical couples of 2nd order, and smooth running of the partial engines singly operating, and of the clutched-in complete engines.

A special feature of the present invention is that the second relative rotation direction is utilized for the synchronization operation. This is accomplished whereby the self-synchronizing clutch incorporates an axially latching-on ratchet mechanism, which is installed with such a grip direction that the pawl(s) are unable to latch onto the ratchet wheel during the starting and cranking-up operation of the secondary engine by the primary engine. See for example, FIG. 21 and FIG. 22. By these means, connection shocks of the self-synchronizing clutch are excluded.

Additionally, the ratchet wheel of the ratchet mechanism has only one gap for each pawl, so that the latching-on of the pawl(s) and the clutching-in can only occur once during each relative revolution of the two partial crankshafts. This clutching-in point coincides with the synchronization point between the partial crankshafts.

The above mentioned sliding movement of the friction clutch-part happens slowly and in a pulsating manner owing to the pulsating character of the torque of the secondary engine. It lasts as long as the pawl(s) latch onto the ratchet wheel, and which finishes the automatic synchronization operation of the two partial crankshafts and partial engines.

BRIEF DESCRIPTION OF THE DRAWINGS

FIG. 1 is a perspective view of a crankshaft system for a 2+2=4-cylinder 4-stroke in-line split environmental engine;

FIG. 2 is a front view of the crankshaft system of FIG. 1;

FIG. 3 is a perspective view of a crankshaft system for a 2V+2V=4V cylinder 4-stroke V-split environmental engine (V-angle 60°);

FIG. 4 is a front view of the crankshaft system of FIG. 3;

FIG. 5 is a perspective view of a crankshaft system for a 2+4=6-cylinder 4-stroke in-line split environmental engine;

FIG. 6 is a front view of the crankshaft system of FIG. 5;

FIG. 7 is a perspective view of a crankshaft system for a 2V+4V=6V-cylinder 4-stroke V-split environmental engine (V-angle 120°);

FIG. 8 is a front view of the crankshaft system of FIG. 7;

FIG. 9 is a perspective view of a crankshaft system for a 2+2+2=6-cylinder 4-stroke in-line multi-split environmental engine.

FIG. 10 is a front view of the crankshaft system of FIG. 9;

FIG. 11 is a perspective view of a crankshaft system for a 2V+2V+2V=6V-cylinder 4-stroke V-multi-split environmental engine (V-angle 90°);

FIG. 12 is a front view of the crankshaft system of FIG. 11;

FIG. 13 is a perspective view of the characteristic crank pair for crankshaft systems of in-line split and multi-split environmental engines, which is the design element of the crankshaft systems according to FIG. 1 and 2, FIG. 5 and 6, and FIG. 9 and 10;

FIG. 14 is a front view of the characteristic crank pair of FIG. 13;

FIG. 15 is a perspective view of the characteristic crank pair for crankshaft systems of V-Split and multi-split environmental engines, which is the design element of the crankshaft systems according to FIG. 3 and 4, FIG. 7 and 8, and FIG. 11 and 12;

FIG. 16 is a front view of the characteristic crank pair of FIG. 15;

FIG. 21 and FIG. 22 are a perspective view of the outlines of the complete split environmental engine with drawn in self-synchronizing clutch.

DESCRIPTION OF THE PREFERRED EMBODIMENT

Referring to FIGS. 13 and 14, the characteristic design element of the crankshaft systems of the present invention when used for in-line engines is a special crank-pair pair which has a firing distance of 360° and consists of two parallel cranks. Referring to FIGS. 15 and 16, the characteristic design element of the crankshaft systems of the present invention when used for V-engines consists of two cranks with a relative gyration offset angle, where the relative gyration offset angle coincides with the V-angle of the engine cylinder blocks. When the V-angle decreases, it has a limiting value of zero degrees, and the V-engine becomes an in-line engine. When, on the other hand, the V-angle increases, it has a limiting value of 180°, and the V-engine becomes an opposed cylinder engine. Additionally, each partial crankshaft has its own partial flywheel.

Figure 23:
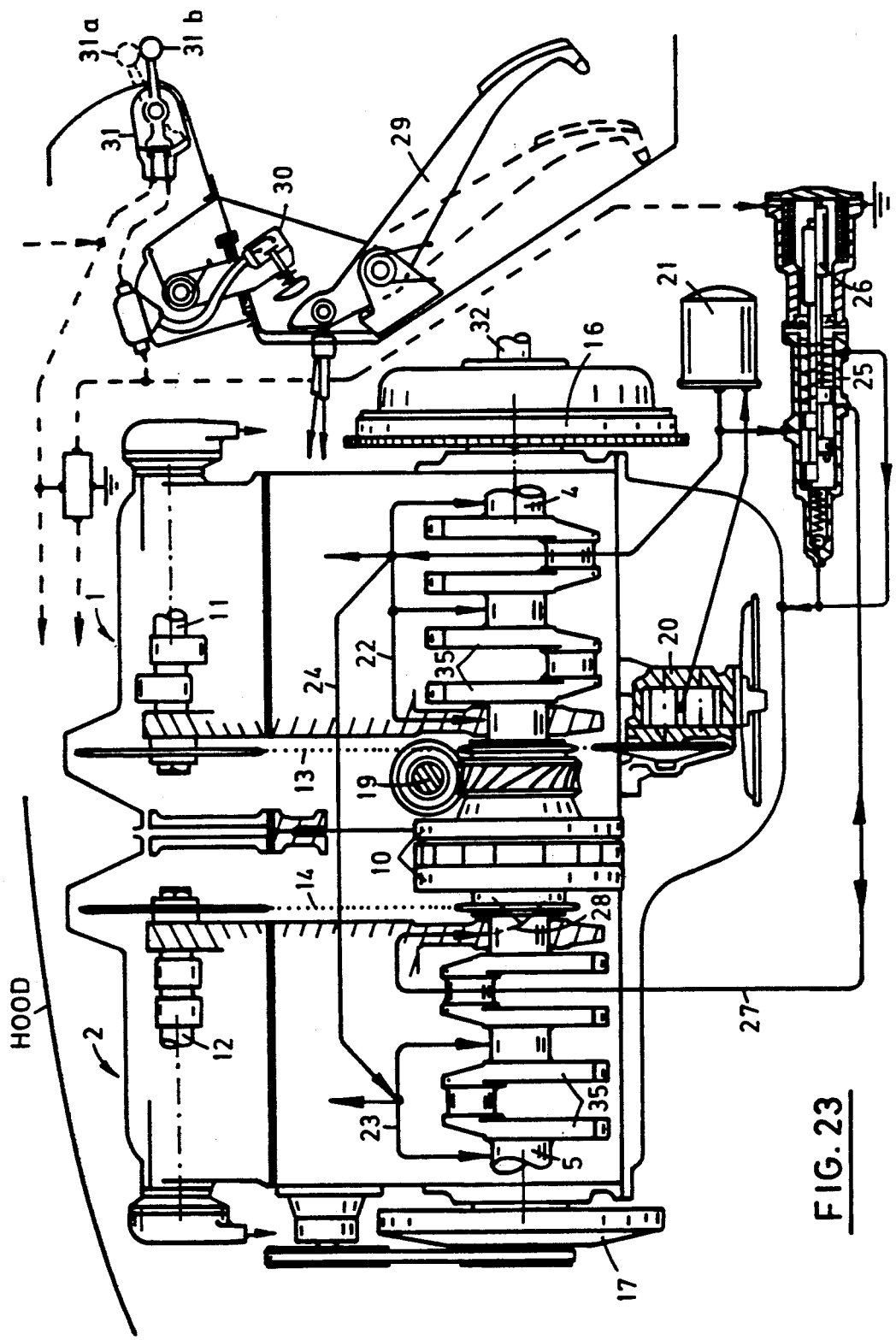
FIG. 23 shows the whole side elevation of the split environmental engine, with section fragments, and the basic conception of the control elements for the engine.

In accordance with the present invention, each conventional 4-cylinder in-line engine can be redesigned into a 2+2=4-cylinder in-line split environmental engine; see FIGS. 1 and 23. For this, the crankshaft will be divided in its middle, and the resulting two crankshaft halves form a first partial crankshaft 4 and a second partial crankshaft 5. In order to construct these novel crank pairs, new crank gyrational offset angles are used. These gyrational offset angles between the cranks of the crank pairs are zero degrees for in-line split environmental engines (FIGS. 13 and 14), by which two connecting rod-journals of said two cranks are positioned at the same time in their upper dead centers, or respectively, in their lower dead centers. Each of the partial crankshafts 4 and 5 comprise one such crank pair with an equal relative position of cranks I and II, respectively III and IV. A self-synchronizing clutch 100 between the partial crankshafts 4 and 5 synchronizes and clutches-in the partial crankshafts 4 and 5 such that the crank-pair of the partial crankshaft 4 has a gyrational offset angle of 180° in relation to the crank-pair of the partial crankshaft 5. This rigid configuration of the crank-pairs results in a constant firing distance of 180°.

In still further accordance with the invention, a first partial balance shaft 7 and a second partial balance shaft 8 of the 1st order belong to each partial crankshaft 4 and 5 which are disposed in one line, parallel to, and on the sides of the partial crankshafts 4 and 5. The partial balance shafts 7 and 8 are individually and oppositely driven by the partial crankshafts 4 and 5. The partial crankshafts 4 and 5 have main counterweights 35, which have gyration offset angles of 180° in relation to the connecting rod-journals of each crank pair. Main counterweights 36 of the partial balance shafts 7 and 8, which are coordinated with each partial crankshaft 4 and 5, are disposed in the same radial planes as the main counterweights 35 of the partial crankshafts 4 and 5. Both types of main counterweights 35 and 36 are arranged for joint operation such that when both main counterweights of one crank pair and of the coordinated partial balance shaft are turned downward, the connecting rod-journals of the crank pairs and the mounted on connecting rods and pistons of the engine are in their upper dead centers. After the synchronization operation and clutching-in of the two partial crankshafts 4 and 5, the partial balance shafts 7 and 8 also rotate synchronous to each other, at which their main counterweights 36 have a constant relative gyration offset angle of 180°. The magnitudes of the main counterweights 35 and 36 are determined such that together they balance the free dynamical forces and free dynamical couples of the 1st order of the reciprocating engine masses. The main counterweights 35 of the partial crankshafts 4 and 5 also contain supplemental weight amounts, by which they get the additional capacity to also balance the free dynamical forces and free dynamical couples of the rotating engine masses. The 4-cylinder in-line split environmental engine designed in accordance with this scheme has balanced the free dynamical forces of 1st order, and the free dynamical couples of 1st and 2nd order, and that inside of the partial engines, and inside of the complete engine. Not balanced are the free dynamical forces of 2nd order, in the same degree as in conventional 4-cylinder engines.

Similar to the 4-cylinder in-line split environmental engine is the 4-cylinder V-Split environmental engine 2V+2V=4V; see FIGS. 3 and 4. For this engine type, with $\alpha°$ V-angle between the two cylinder blocks, the two engine cylinders belonging to one crank pair also have a relative V-angle of $\alpha°$. Also, the two cranks of one crank pair have a relative gyration offset angle of $\alpha°$, see FIGS. 15 and 16. Accordingly, the two connecting rod journals of one crank pair are also positioned in the same time in their upper dead centers, or respectively in their lower dead centers. Each of the two partial crankshafts 4 and 5 comprises such a crank pair, with the equal relative gyration offset angle of the cranks I and II, respectively III and IV, see FIGS. 3 and 4. The self-synchronizing clutch 10 between the partial crankshafts 4 and 5 synchronizes and clutches-in the partial crankshafts 4 and 5 in such a way that the crank pair of the partial crankshaft 4 has a gyration offset angle of 180° in relation to the crank pair of the partial crankshaft 5. This rigid configuration of the crank pairs results also in a constant firing distance of 180°. Partial balance shafts 7 and 8 of the 1st order belong to each partial crankshaft 4 and 5 which are also disposed in one line, parallel to the partial crankshafts 4 and 5, on their sides or above them. The partial balance shafts 7 and 8 are individually and oppositely driven by the partial crankshafts 4 and 5. The partial crankshafts have main counterweights 35, individually provided for each crank pair, which are fastened to the partial crankshafts 4 and 5 in the bisecting line of the gyration angle between the two cranks of each crank pair, but on the other side of the crankshaft axis. The main counterweights 36 of the partial balance shafts 7 and 8, coordinated with each partial crankshaft 4 and 5, are disposed in the same radial planes as the main counterweights 35 of the partial crankshafts 4 and 5, and both types of main counterweights 35 and 36 are arranged for a joint operation in this way that when both the main counterweights of one crank pair and of the coordinated partial balance shaft are turned downward, the connecting rod journals of the crank pair and the mounted on connecting rods and pistons of the engine are in their upper dead centers, and are positioned in the planes of the cylinder blocks, on both sides of the symmetrical plane of the engine; see FIGS. 3, 4, 15 and 16. After the synchronization operation and clutching-in of the two partial crankshafts 4 and 5, the partial balance shafts 7 and 8 also rotate synchronously to each other, at which their main counterweights 36 have a constant relative gyration offset angle of 180°. The magnitudes of the main counterweights 35 and 36 are determined such that together they have the capacity to balance the free dynamical forces and free dynamical couples of 1st order of the reciprocating engine masses. The main counterweights become smaller, as the V-angle of the two engine cylinder blocks becomes larger and the counterweights come down to zero at the limiting V-angle of 180°, i.e., for opposed cylinder engines. The main counterweights 35 also contain supplemental weight amounts, by which they get the additional capacity also to balance the free dynamical forces and free dynamical couples of the rotating engine masses.

Referring to FIGS. 3, 4, 15 and 16, the balancing of free dynamical couples of the 1st order have the partial crankshafts 4 and 5 and auxiliary counterweights 37 fastened to their end-webs, and partial balance shafts 7, 8 and 9 and auxiliary counterweights 38 disposed in the radial planes of the end-webs of the coordinated partial crankshafts. The auxiliary counterweights 37 and 38 have gyration offset angles of 90° in relation to the main counterweights 35 and 36, and also are arranged for joint operation in this way such that when the main counterweights of one crank pair are turned parallel downward, the auxiliary counterweights are directed horizontally, to same sides of the partial crankshaft and on the partial balance shaft, and are turned off from the connecting rod-journals on the partial crankshafts. The auxiliary counterweights becomes larger as the V-angle between the two engine cylinder blocks become larger. The auxiliary counterweights have the value zero for in-line engines, but they come up to their highest values, when the V-angle between the engine cylinder blocks becomes 180°, i.e., for opposed cylinder engines.

The 4-cylinder V-split environmental engine designed in accordance with this scheme has balanced the free dynamical forces of 1st order, and the free dynamical couples of 1st and 2nd order. Not balanced are the free dynamical forces of the 2nd order, but they are all smaller as the V-angle between the two engine cylinder blocks becomes larger. These forces decrease with the cosine of the half-cylinder V-angle, to ½, of the forces of an in-line engine, at a V-angle of 120°, and come down to zero at the V-angle of 180°, i.e., they are balanced.

Similar to the 4-cylinder in-line split environmental engine is the in-line 2+4=6-cylinder split environmental engine (see FIGS. 5 and 6) and the in-line 2+2+2=6-cylinder multi-split environmental engine (see FIGS. 9 and 10). Both of these engines have partial crankshafts with crank pairs according to FIGS. 13 and 14. The split environmental engine according to FIGS. 5 and 6 comprises the partial crankshaft 4 of primary engine 1, one crank pair, the partial crankshaft 5 of secondary engine 2, two crank pairs with a relative gyration offset angle of 120°. The partial balance shaft 8 of the secondary engine 2 also has two main counterweights 36 with a relative gyration offset angle of 120°.

The self-synchronizing clutch 10 between the two partial crankshafts 4 and 5 synchronizes and clutches-in the partial crankshafts 4 and 5 in this way that the three crank pairs have relative gyration offset angles of 120°, and the 6-cylinder split environmental engine always has equal firing distances of 120°.

In the multi-split environmental engine according to FIGS. 9 and 10, each of the three partial crankshafts 4, 5 and 6 is equipped with only one crank pair. Each of the three partial balance shafts 7, 8, and 9 is equipped also with only one main counterweight 36 at which each partial crankshaft is coordinated with one partial balance shaft. The two self-synchronizing clutches 10 between the three partial crankshafts 4, 5, and 6 synchronize and clutch-in the three partial crankshafts in this way that the three crank pairs have relative gyration offset angles of 120°, and the 6-cylinder multi-split environmental engine always has equal firing distances of 120°.

Similar to the 4-cylinder V-split environmental engine is the 6-cylinder V-split environmental engine 2V+4V=6V (see FIGS. 7 and 8) and the 6-cylinder V-multi-split environmental engine 2V+2V+2V=6V (see FIGS. 11 and 12), which especially as V-engines with 120° V-angles appear to be very attractive for packaging. Both of these engines have partial crankshafts with crank pairs according to FIGS. 15 and 16. The V-split environmental engine according to FIGS. 7 and 8 comprises the partial crankshaft 4 of the primary engine 1, one crank pair, the partial crankshaft 5 of the secondary engine 2, two crank pairs with a relative gyration offset angle of 120°, and the partial balance shaft 8 of the secondary engine has also two main counterweights 36 with a relative gyration offset angle of 120°, and auxiliary counterweights 38. The self-synchronizing clutch 10 between the two partial crankshafts synchronizes and clutches-in the partial crankshafts 4 and 5 in this way that the three crank pairs have relative gyration offset angels of 120° and the 6-cylinder V-split environmental engine always has equal firing distances of 120°.

The V-multi-split environmental engine according to FIGS. 11 and 12 has each of the three partial crankshafts 4, 5, and 6 equipped with only one crank pair, and has each of the three partial balance shafts 7, 8, and 9 equipped also with only one main counterweight 36, and two auxiliary counterweights 38, at which each partial crankshaft is coordinated with one partial balance shaft. The two self-synchronizing clutches 10 between the three partial crankshafts synchronize and clutch-in the three partial crankshafts in this way that the three crank pairs have relative gyration offset angles of 120°, and the 6-cylinder V-multi-split environmental engine always has equal firing distances of 120°. For V-split and multi-split environmental engines with larger V-angles between the two cylinder blocks it is advantageous to dispose the split balance shafts 7, 8, and 9 above the partial crankshafts and between the cylinder blocks, as shown in FIGS. 7, 8, 11 and 12.

For split and multi-split engines with more than 6 cylinders, the relative gyration offsets of the pairs of cranks of the partial crankshafts are also equally angularly spaced in the 360° common crankshaft front view, when the partial crankshafts are mutually synchronized and clutched-in. Accordingly, an 8-cylinder engine has equal gyration offset angles of 90°, a 12-cylinder engine has equal gyration offset angles of 60°, etc. Still further comprises each partial balance shaft counterweights for only so many crank pairs, as the number of crank pairs on the coordinated partial crankshaft is. When a partial crankshaft has only one crank pair, this partial crankshaft and the coordinated partial balance shaft also have counterweights for balancing of only one crank pair. When a partial crankshaft has several crank pairs, however, this partial crankshaft and the coordinated partial balance shaft also comprise counterweights for balancing of several crank pairs. The more than 6-cylinder split and multi-split environmental engines also have equal firing distances, e.g., an 8-cylinder engine every 90°, the free dynamical forces and free dynamical couples are balanced, and the specified angle data and balancing criterions are valid for in-line engines and for all V-engines.

Referring to the self-synchronizing clutch in FIGS. 17 through 21, between the partial crankshafts is a subsequently developed design from my German applications P 35 22 988.9 and P 37 05 045, and it comprises a friction clutch-part and an axially latching-on ratchet mechanism-part. Both of these parts are connected in parallel so that the torque of the secondary engine 2 or tertiary engine 3 can be transferred by one or the other of the clutch-parts, as well as by both clutch-parts together. The friction clutch-part has a reduced torque transferring capacity, resulting in a slowly sliding movement of the friction clutch-part when the torque of the firing secondary engine 2 or tertiary engine 3 is applied. The ratchet mechanism-part has a characteristic grip-direction which is opposite to the relative rotation direction between the two partial crankshafts 4 and 5 during the starting and cranking-up operation of the secondary engine 2 by the primary engine 1 (see FIG. 21), at which the primary engine 1 serves as the starter motor. The same characteristic grip direction is also valid for the self-synchronizing clutch 10 between the secondary engine 2 and the tertiary engine 3.

The self-synchronizing clutch 10 of the present invention is further developed and has a better design. This is accomplished by a single annular piston 50, which acts directly onto a first friction ring 53 and a second friction ring 54. Additionally, pawls 60 have an improved axial latching-on direction, by which the movements of the annular piston 50 are also directly utilized for actuation of the pawls 60.

In detail, the self-synchronizing clutch 10 has the following design. The clutch housing 45, in the shape of a drum, has a short coaxial cylinder 43 for the annular piston 50, with an inner pilot 44 for the piston, and a central pressed-in pivot 46. The cylinder 43 is connected with an electromagnetically operated pressure-oil-switch 25, by means of oil lines 27, 28 and 81. The electrical signals for the switch arrive from an electrical signal transmitter 30 or from a microprocessor at the accelerator pedal 29.

The clutch housing has also a cover 47 in the shape of a ring, on which are beared the pawls 60, 61, and 62. A friction ring 53 of the friction clutch-part is fastened to the annular piston 50, while the second friction ring 54 is fastened to the cover 47. The friction disk 55, of the friction clutch-part, is disposed between the friction rings.

The friction clutch-part has a reduced torque transferring capacity, and is dimensioned so that the clutched-in friction clutch-part has the capacity only to transfer the cranking-up torque of the primary engine 1, when it is starting the secondary engine 2. But when afterwards, the torque of the firing secondary engine 2 is applied, the friction clutch-part is intentionally overloaded, and it slides slowly with a pulsating movement. This sliding is necessary for the automatic synchronization operation between the two connected partial crankshafts, and lasts as long as the pawls 60 latch into their gaps 57 in the ratchet wheel 56. The ratchet wheel 56 is permanently and rigidly connected with the friction disk 55, and has preferably two pawl-gaps 57, one pawl-gap for each pawl 60, with a relative gyrational offset of 180°. Another number of pawl-gaps is also practicable, with a corresponding number of pawls.

A plate spring in the shape of a star 51 is circularly fastened to the middle portion of the annular piston 50 by a circular row of bolts. The star-plate-spring extends with their several spring tongues 41 to the periphery of the clutch housing 45, where the tongues are surrounded on four sides, by parts of the clutch housing and its cover, and embedded. The star-plate-spring consists out of one or several spring stars, or out of star segments, and it represents:

the readjusting spring for the annular piston 50;
the straightener device for an approximately parallel guide of the annular piston; and
the twist safeguarding device for the annular piston.

Additionally, the star-plate-spring has at least two further and shorter spring tongues 52 for actuating of the pawls 60, which turn the pawls into their latched-on position 74, and which are disposed with a relative gyration offset of 180°.

The pawls 60, preferably two pieces and disposed with a relative gyration offset of 180°, are designed for an axial latch onto the ratchet wheel 56; see FIGS. 17, 19, 20 and 21. The pawls have counterweights 61 and pivots in the shape of pins 62, with a substantially radial disposition in relation to the rotational axis of the clutch, so that the latches on faces of the pawls are positioned radially or approximately radially to the rotational axis of the clutch; see FIG. 19. The pins 62 are fastened to the cover 47. Additionally the two pawls are so designed that they can only latch into the correct one of the two pawl-gaps 57 in the ratchet wheel 56, which is achieved by radial different widths of the pawls and of the gaps, and by two types of retaining stays 63 and 58, one on the narrower pawl, the second one at the broader pawl-gap, which cooperate with each other.

This results in only one clutching-in point after each complete relative revolution between the two partial crankshafts, and this clutching-in point coincides with the synchronization point between the two partial crankshafts 4 and 5, and the two connected partial engines. The pawls 60 have readjusted springs 66, with substantially small spring forces, which are forcing the pawls into the latched out position 73. The pawls have also resilient stops 67, with substantially large spring forces, for stopping of the pawls during the latching-on operation, to prevent a hard dash against the grounds of the gaps.

Push-pins 64 are installed between the spring tongues 52 of the star-plate-spring 51 and the pawls 60, of which the longitudinal axes are disposed parallel to the rotation axis of the clutch. The pins move forward together with the annular piston 50, during activation of the self-synchronizing clutch, accompanied by turning the pawls into their latched-on position 74. Similarly, the pins move backward during the deactivation operation of the clutch, accompanied by back turning of the pawls into their latched-out position 73. The push-pins 64 work on hardened round members 65 in the pawls, which are disposed near the pawl pivots.

The self-synchronizing clutches operate such that during the starting and cranking-up operation of the secondary engine 2 by the primary engine 1, the primary engine 1 has a rotation advance, during which the friction clutch-part is cranking-up the secondary engine 2 until it starts firing. The pawls, due to their grip direction, are unable to latch-on the ratchet wheel 56, since the pawls fall into the pawl-gaps from their steep slopes 59, and slip out on their gentle slopes 42. After the secondary engine 2 has started firing, however, it advances the primary engine 1, the relative rotation direction changes, and the pawls slip into the pawl-gaps on their gentle slopes, and latch-in on their steep slopes 59.

Finally, the ratchet wheels 56 are gyrationally and resiliently connected with the partial crankshaft 4 of the primary engine 1 respectively for multi-split environmental engines, resiliently connected with the partial crankshaft 5 of the secondary engine 2. The gyratory resilience is accomplished by tangential springs 75 and damped by hydrostatic vibration dampers.

Each damper has a housing 70 which is formed by the middle section of the rachet wheel 56 and the friction disk 55. The damper comprises rectangular pistons 71, which are alternately fastened to the housing 70 and to the hub 72 of the damper and the side covers.

Tangential springs 75 are installed between the damper housing and the damper hub, acting parallel to the torsional vibration damper. The tangential springs 75 can also be designed as progressively acting springs with stepwise engaging single springs. The hub 72 of the damper has two roller bearings 78 and one ball bearing 79, which carry the hub on the central pivot 46 of the clutch housing 45. The ball bearing is axially movable on the pivot, and an undulated spring ring 80 causes a light axial pressure on the hub and the damper housing 70, so that during stoppage of the secondary engine 2, the friction disk 55 is moved slightly forward. This interrupts the contact between the friction disk and the second friction ring 54, and avoids any friction between the two partial crankshafts.

The internal space on the torsional vibration damper is currently fed with lubrication oil taken from the engine lubrication system. This is accomplished by oil lines 82 and a throttle 83, and is sealed by two gaskets 84. The first oil filling is conveyed this way as well as the constant oil exchange of the oil damper. The damper is inserted between the partial crankshafts 4 and 5 and dampens the oscillating torsional vibrations between the partial crankshafts and the partial engines. The central pivot 46 has a longitudinal bore, in which the central fastening bolt 48 of the clutch is accommodated.

Figure 17:
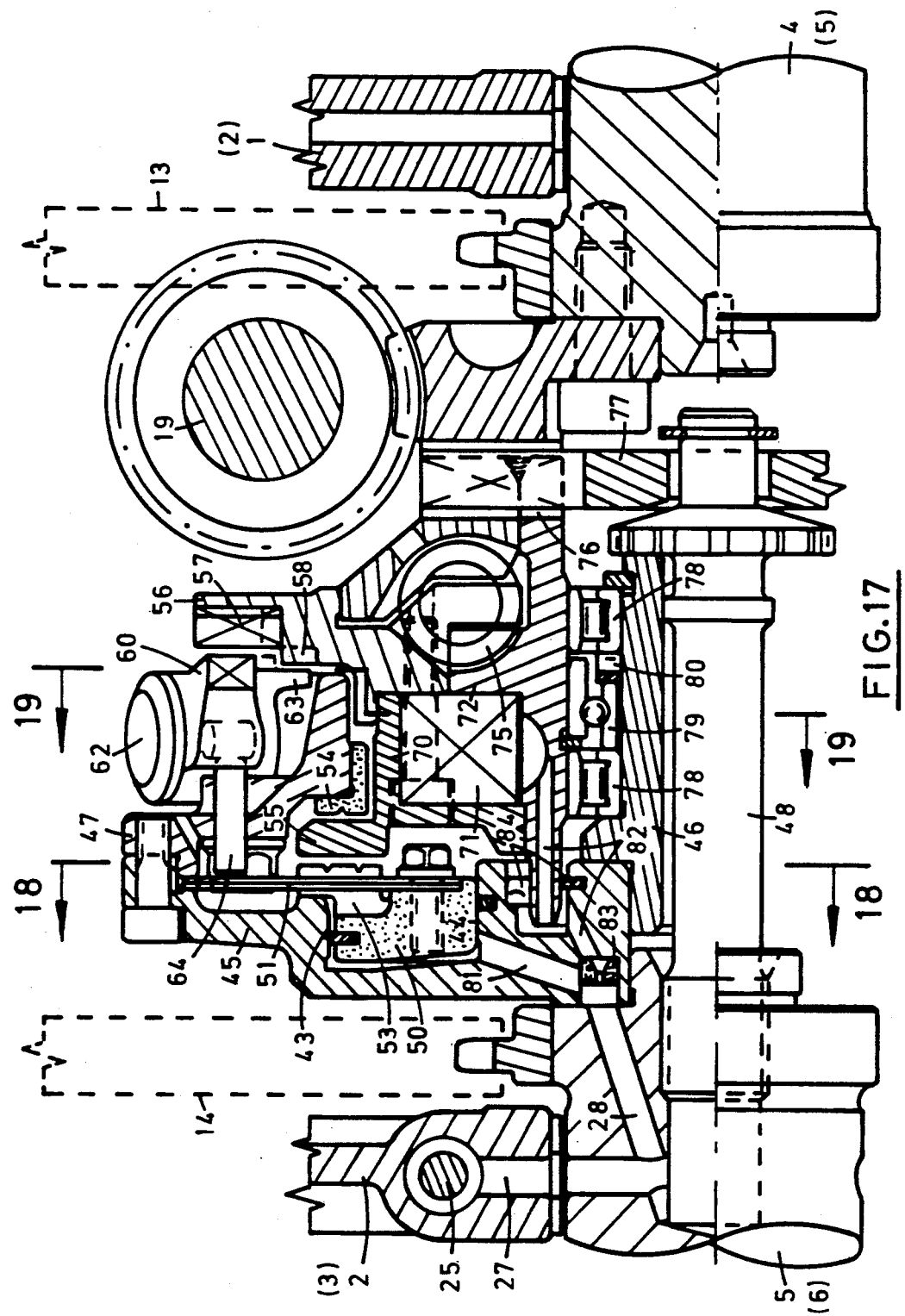
FIG. 17 is an axial half-sectional view of the self-synchronizing clutch for the crankshaft systems according to FIG. 1 through FIG. 12.
Figure 18:
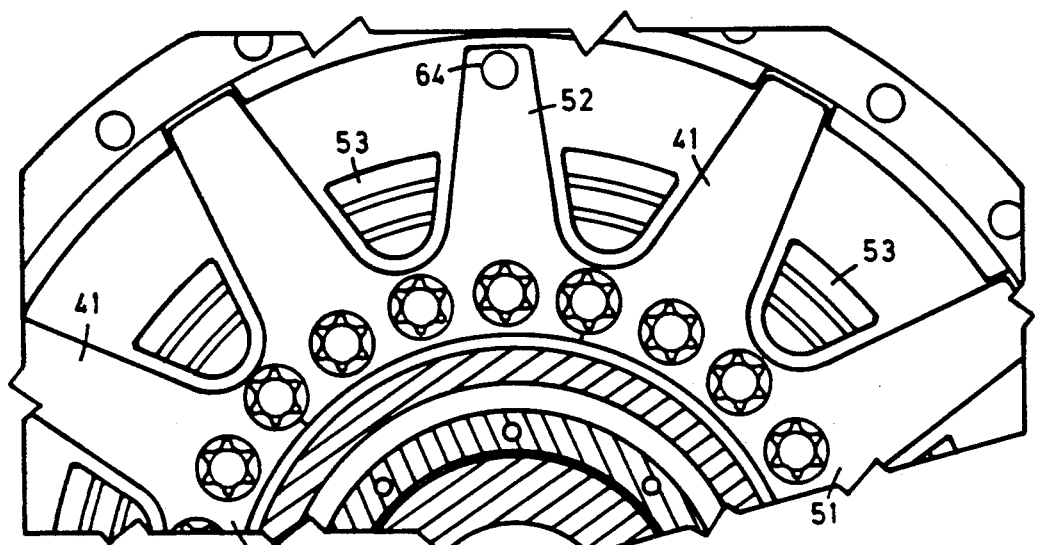
FIG. 18 is a cross-sectional view of the axial half-sectional view of the self-synchronizing clutch of FIG. 17.
Figure 19:
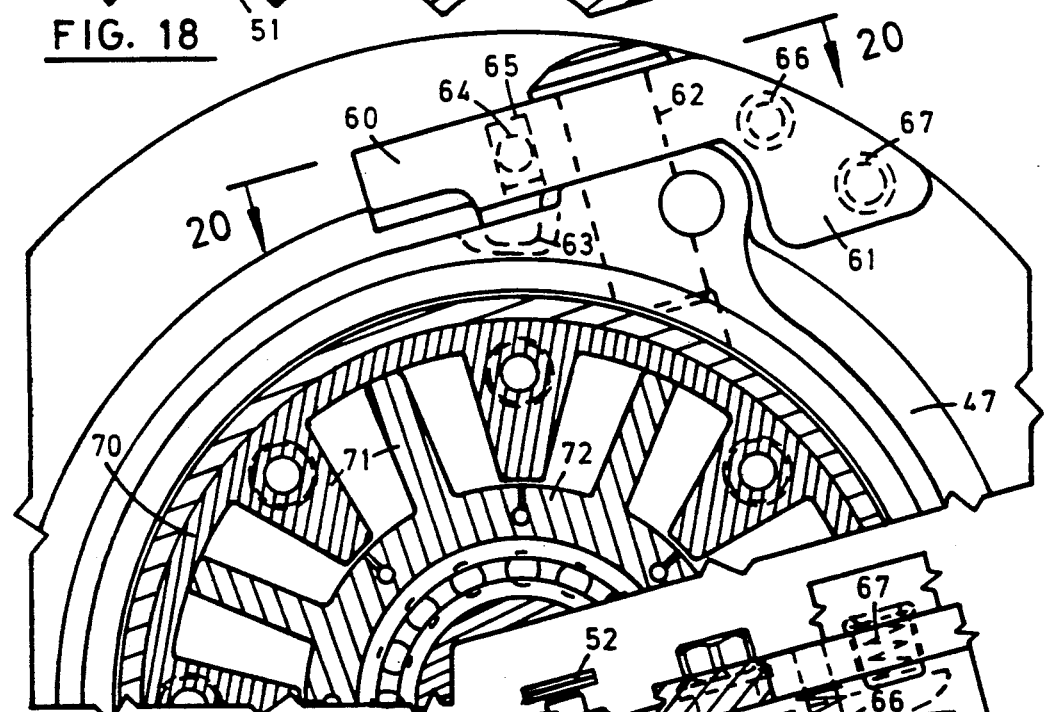
FIG. 19 is a cross-sectional view of the axial half-sectional view of the self-synchronizing clutch of FIG. 17.
Figure 20:
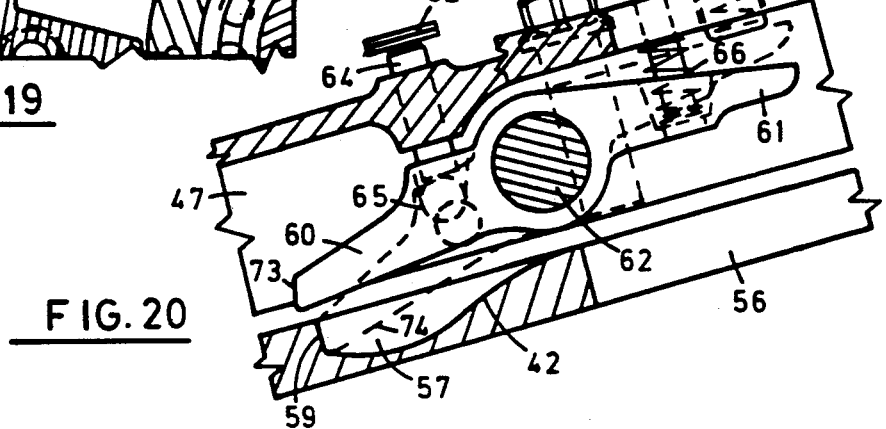
FIG. 20 is a cross-sectional view taken across line 20—20 of FIG. 19.

The self-synchronizing clutch is designed as a preassembled unit as shown in FIG. 17.

Although preferred embodiments of the invention have been described in the foregoing detailed description and illustrated in the accompanying drawings, it will be understood that the invention is not limited to the embodiments disclosed, but is capable of numerous rearrangements, modifications and substitution of parts and elements without departing from the spirit of the invention. Accordingly, the present invention id intended to accomplish such rearrangements, modifications and substitution of parts and elements as fall within the spirit and scope of the appended claims.

I claim:

1. In a split environmental engine and multi-split environmental engine for motor vehicles, which engine includes coaxially arranged split crankshafts with a primary partial crankshaft for a primary engine disposed at the rear power output end of the engine, at least one secondary partial crankshaft for at least one secondary engine disposed at the front end of the engine, and connecting clutches; a crankshaft system comprising:

a) two partial crankshafts, each of which comprises at least one pair of cranks with a firing distance of 360°, each of said crank pair consisting of two parallel cranks for in-line engines, and of two cranks with a relative gyration offset angle for V-engines, and two connecting rod-journals such that the two connecting rod-journals of said two cranks of one pair are positioned in the same time in their upper dead centers or respectively in their lower dead centers, and each of said partial crankshafts comprising specially arranged counterweights and being equipped with its own partial flywheel;

b) split balance shafts consisting of partial balance shafts, each of said partial balance shafts being coordinated with one of said partial crankshaft in each partial engine and individually and oppositely driven by said partial crankshaft, said partial balance shafts beings disposed in one line and parallel to said partial crankshafts, on their sides and respectively above them, and each said partial balance shaft comprising specially arranged counterweights; and c) selectively adapted self-synchronizing clutches comprising a friction clutch-part and an axially latching-on ratchet mechanism-part, both said clutch-parts connected in parallel so that torque can be transferred by one or the other of said clutch-parts as well as by both clutch-parts together, and said friction clutch-part having as a characteristic feature a reduced torque transferring capacity resulting in a slowly sliding movement of said friction clutch-part when the torque of the firing secondary engine is applied, said ratchet mechanism-part having a characteristic grip-direction being opposite to that of the relative rotation direction between said two partial crankshafts during starting and cranking-up operations of the secondary engine, the ratchet wheel of said ratchet mechanism having only one pawl-gap for each pawl, which results in only one clutching-in point after each complete relative revolution, and which clutching-in point coincides with the synchronization-point between the two said partial crankshafts and the two said partial engines, and said self-synchronizing clutches being characterized by an automatic mutual synchronization of said partial crankshafts and said partial engines;

whereby all components of said crankshaft system cooperate dynamically in this characteristic manner such that the split and multi-split environmental engine has equal firing distances inside of their 4-stroke partial engines, and inside of the clutched-in complete 4-stroke engines, a secured balancing of the free dynamical forces and free dynamical couples of 1st order, and an acceptable balancing of the free dynamical forces and free dynamical couples of 2nd order, and smooth running of the partial engines singly operating, and of the clutched-in complete engines.

2. The crankshaft system according to claim 1 wherein, for a 2+2=4-cylinder split environmental engine, said partial crankshaft of said primary engine comprises one said pair of cranks, and said partial crankshaft of said secondary engine comprises also one said pair of cranks; the two said pairs of cranks have a relative gyration offset of 180°, when the two said partial crankshafts are mutually synchronized and clutched-in, the 4-cylinder Split Environmental Engine has equal firing distance of 180°, the free dynamical forces of 1st order, and the free dynamical couples of 1st order and of 2nd order are balanced, and the specified angle data and balancing criterions are valid for in-line engines, for all V-engines, and including the limiting V-angle of 180°.

3. The crankshaft system according to claim 1 wherein, for a 2+4=6-cylinder split environmental engine, said partial crankshaft of said primary engine comprises one said pair of cranks, and said partial crankshaft of said secondary engine comprises two further said pairs of cranks, with a fixed relative gyration offset of 120°, when the two said partial crankshafts are mutually synchronized and clutched-in, the three said pairs of cranks have a relative gyration offset of 120°, the 6-cylinder split environmental engine has equal firing distances of 120°, the free dynamical forces of 1st and of 2nd order, and the free dynamical couples of 1st order are balanced, and the specified angle data and balancing criterions are valid for in-line engines, for all V-engines, and including the limiting V-angle of 180°.

4. The crankshaft system according to claim 1 wherein, for a 2+2+2=6-cylinder multi-split environmental engine, said partial crankshaft of said primary engine, said partial crankshaft of said secondary engine, and said partial crankshaft of the tertiary engine comprise, each of them, one said par of cranks; the three said pairs of cranks have relative gyration offsets of 120°, when the three said partial crankshafts are mutually synchronized and clutched-in, the 6-cylinder multi-split environmental engine has equal firing distances of 120°, the free dynamical forces of 1st and of 2nd order, and the free dynamical couples of 1st order are balanced, and the specified angle data and balancing criterions are valid for in-line engines, for all V-engines, and including the limiting V-angle of 180°.

5. The crankshaft system according to claim 1 wherein, for more than 6-cylinder split environmental engines and for multi-split environmental engines, said relative gyration offsets of said pairs of cranks of said partial crankshafts are angularly also equally spaced in the 360° common crankshaft front view, when said partial crankshafts are mutually synchronized and clutched-in; when a partial crankshaft of these engines, but also of all other split environmental engines, has only one said crank pair, this partial crankshaft and the coordinated partial balance shaft have counterweights for balancing of only one crank pair; when, however, a partial crankshaft has several said crank pairs, this partial crankshaft and the coordinated partial balance shaft comprise counterweights for balancing of several crank pairs; said more than 6-cylinder split environmental engines and multi-split environmental engines also have equal firing distances; the free dynamical forces and free dynamical couples are balanced, and the specified angle data and balancing criterions are valid for in-line engines, for all V-engines, and including the limiting V-angle of 180°.

6. The crankshaft system according to claim 1 wherein said main counterweights on said partial crankshafts are individually provided for each of said pair of cranks, and have for in-line engines gyration offsets of 180° in relation to the connecting rod-journals of said crank pairs; said main counterweights on said partial balance shafts, which are coordinated with said partial crankshafts, are disposed in the same radial planes as on said partial crankshafts, both said main counterweights of each said crank pair and of the coordinated partial balance shaft are so arranged for a joint operation that when both said main counterweights are turned downward the connecting rod-journals of said crank pairs and the mounted on connecting rods and pistons of the engine are in their upper dead centers; and analogous for V-engines, said main counterweights on said partial crankshafts are fastened to the partial crankshafts in the bisecting line of the gyration angle between the two cranks of each crank pair, but on the other side of the crankshaft axis; said main counterweights on said partial balance shafts, which are coordinated with said partial crankshafts, are disposed in the same radial planes as on said partial crankshafts, both said main counterweights of each said crank pair and of the coordinated partial balance shaft are so arranged for a joint operation that when both said main counterweights are turned downward the connecting rod-journals of said crank pairs and the mounted on connecting rods and pistons are in their upper dead centers, and are positioned in the planes of the cylinder blocks, on both sides of the symmetrical plane of the engine.

7. The crankshaft system according to claim 1 wherein said main counterweights of said partial crankshafts and said main counterweights of said partial balance shafts have such magnitudes that they have the capacity to balance the free dynamical forces and the free dynamical couples of 1st order of the reciprocating masses, and said main counterweights of said partial crankshafts also contain supplement weight amounts, by which they have the additional capacity to balance also the free dynamical forces and free dynamical couples of the rotating masses.

8. The crankshaft system according to claim 1 wherein V-engines have for balancing of the free dynamical couples of 1st order also auxiliary counterweights on said partial crankshafts, fastened to their end-webs, and auxiliary counterweights on said partial balance shafts, disposed in the radial planes of said end-webs of said coordinated partial crankshafts; said auxiliary counterweights have gyration offsets of 90° in relation to said main counterweights; when said main counterweights are turned parallel downward, said auxiliary counterweights are directed horizontally to the same sides on said partial crankshafts and on said partial balance shafts, and are turned-off from the connecting rod-journals on said partial crankshafts.

9. The crankshaft system according to claim 1 wherein said self-synchronizing clutches are activated by pressurized oil taken from the oil-supply system of said split and multi-split environmental engines, while the oil flows are controlled by the accelerator pedal and signal transmitters respectively microprocessors; and said self-synchronizing clutches comprising:
(a) a clutch housing in the shape of a drum, with a central pivot, a short coaxial cylinder with a central pilot for an annular piston, oil lines connected with the control lines in said partial crankshaft, a cover of said housing in the shape of a ring, on which are beared said two pawls of said ratchet mechanism-part;
(b) said annular piston, which activates and deactivates said whole clutch, a friction ring fastened to said piston, a second friction ring fastened to said cover, a friction disk of said friction clutch-part, which is disposed between said two friction rings;
(c) a ratchet wheel for axial latching of said pawls which is permanently and rigidly connected with said friction disk, and which has preferably two pawl-gaps, with a relative gyration offset of 180°, and with different radial widths;
(d) a plate spring in the shape of a star circularly fastened to the middle portion of said annular piston by a circular row of bolts, said plate spring extends with their several spring tongues to the periphery of said clutch housing, where said tongues are surrounded on four sides and imbedded; said star-plate-spring represents:
  (i) the readjusting spring for said annular piston;
  (ii) the straightener device for an approximately parallel guide of said annular piston; and
  (iii) the twist safeguarding device for said annular piston;

and said star-plate-spring has at least two further and shorter spring tongues for actuating of the pawls, disposed with a relative gyration offset of 180°;

(e) two pawls for axial latching onto said ratchet wheel, and having a relative gyration offset of 180°, counterweights for said pawls, pawl-pivots in the shape of pins, which have substantially radial disposition in relation to the rotation axis of said clutch said pins are fastened to said cover; said pawls are such characterized that they can only latch into one of the two said pawl-gaps, which is achieved by different radial widths of said pawls, and two types of retaining stays one on said narrower pawl, the second one at said broader pawl-gap, which are cooperating with each other;

(f) readjusting springs with substantially small spring force, for said pawls, which are forcing said pawls into the latched-out positions, resilient stops, with substantially large spring forces, for stopping of said pawls during the latching-on operation;

(g) push-pins with longitudinal axes disposed parallel to the rotation axis of said clutch, said push-pins are installed between said spring tongues of said star-plate-spring and said pawls, and move forward, together with said annular piston, during activation of said self-synchronizing clutch, turning said pawls into their latched-on position, and vice versa, said push-pins are moving backward during the deactivation operation of said clutch, accompanied by back turning of said pawls into their latched-out position;

whereby said self-synchronizing clutches operate in this characteristic manner that during the starting and cranking-up operation of said secondary engine by said primary engine, said primary engine has a rotation advance, during which said pawls, owing to their grip direction, are unable to latch-on said ratchet wheel, since said pawls fall into said pawl-gaps from their step slops, and slip out on their gentle slops; but after said secondary engine has started firing, this engine advances said primary engine, the relative rotation direction changes, and said pawls slip into said pawl-gaps on their gentle slops, and latch-in on their step slops.

10. The crankshaft system according to claim 1 wherein said self-synchronizing clutches have said ratchet wheels gyrational resiliently connected with said partial crankshaft of said primary engine, respectively for multi-split environmental engines, resiliently connected with said partial crankshaft of said secondary engine, and said gyratory resilience is accomplished by tangential springs, and by hydrostatic torsional vibration dampers, and each damper comprising:

(a) a housing, formed by the middle section of said ratchet wheel and said friction disk, rectangular pistons which are alternately fastened to said housing and a hub of said damper, side covers, said tangential springs installed parallel to said torsional vibration damper, which alternatively can also be progressively acting springs, being stepwise engaged;

(b) said hub of said damper has two roller bearings and one ball bearing, carrying said hub on said central pivot of said clutch housing, of which said ball bearing is axially movable on said pivot, while an undulated spring ring causes a light axial pressure on said hub and said damper housing, so that during stoppage of said secondary engine, said hub, said housing, and said friction disk are moving slightly forward, which interrupts the contact between said friction disk and said second friction ring;

where the internal space of said torsional vibration damper is currently fed with lubrication oil of the engine, by oil lines and a throttle, which are sealed by two gaskets, said central pivot has a longitudinal bore, in which is accommodated the central fastening bolt of said clutch, said self-synchronizing clutch is designed as a preassembled unit, and said tangential springs and said torsional vibration dampers are inserted between said partial crankshafts, and are damping the oscillating torsional vibrations between said partial crankshafts, and said partial engines.

* * * * *

UNITED STATES PATENT AND TRADEMARK OFFICE
CERTIFICATE OF CORRECTION

PATENT NO. : 5,092,293
DATED : March 3, 1992
INVENTOR(S) : Herbert M. Kaniut It is certified that error appears in the above-identified patent and that said Letters Patent is hereby corrected as shown below:

```
Column 5, line 2,after "crank-pair" delete --pair--;
Column 5, line 31, "100" should read --10--;
Column 13, line 19, "par" should read --pair--;
```

Signed and Sealed this

Seventeenth Day of August, 1993

*Attest:*

BRUCE LEHMAN

*Attesting Officer*          *Commissioner of Patents and Trademarks*